US011023440B1

(12) United States Patent
Gupta et al.

(10) Patent No.: US 11,023,440 B1
(45) Date of Patent: Jun. 1, 2021

(54) SCALABLE DISTRIBUTED DATA PROCESSING AND INDEXING

(71) Applicant: Amazon Technologies, Inc., Seattle, WA (US)

(72) Inventors: Pracheer Gupta, Stanford, CA (US); Madan Mohan Rao Jampani, Mountain View, CA (US); Andrea Olgiati, Gilroy, CA (US); Poorna Chand Srinivas Perumalla, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 15/634,334

(22) Filed: Jun. 27, 2017

(51) Int. Cl.
*G06F 16/00* (2019.01)
*G06F 16/22* (2019.01)
*G06F 16/901* (2019.01)

(52) U.S. Cl.
CPC ...... *G06F 16/2264* (2019.01); *G06F 16/2237* (2019.01); *G06F 16/2272* (2019.01); *G06F 16/9024* (2019.01)

(58) Field of Classification Search
CPC . G06F 16/3347; G06F 16/2264; G06F 16/283
See application file for complete search history.

(56) References Cited

U.S. PATENT DOCUMENTS

| 6,275,822 | B1 * | 8/2001 | Consens | G06F 16/2272 |
| 2003/0018623 | A1 * | 1/2003 | Aggarwal | G06F 16/2264 |
| 2017/0011091 | A1 * | 1/2017 | Chehreghani | G06F 16/22 |
| 2017/0193041 | A1 * | 7/2017 | Fuchs | G06F 16/2453 |

OTHER PUBLICATIONS

Thomas Seidl, Optimal Multi-Step k-Nearest Neighbor Search, Jul. 1998, ACM Sigmod (Year: 1998).*
U.S. Appl. No. 15/634,577, filed Jun. 27, 2019.

* cited by examiner

*Primary Examiner* — Thu Nguyet T Le
(74) *Attorney, Agent, or Firm* — Davis Wright Tremaine LLP

(57) ABSTRACT

A computing resource service provider deploys resources to process input data sets on an ongoing basis and provide requestors with queryable data structures generated from the input data sets over determined, rolling periods of time. In one embodiment, the input data sets are processed using one or more nearest neighbor search algorithms, and the outputs therefrom are represented in data structures which are rotated as newer data structures are subsequently generated. The disclosed systems and techniques improve resource utilization, processing efficiency, query latency, and result consistency relative to known controls for large and/or complex data processing tasks, such as those employed in machine learning techniques.

20 Claims, 10 Drawing Sheets

SCALABLE DISTRIBUTED DATA PROCESSING AND INDEXING

BACKGROUND

Data generation, consumption, and processing demands are increasing at a dramatic rate. As datasets become larger, the processes and algorithms implemented for gaining insight into and managing the data are becoming increasingly complex. Additionally, as data tends to change in scope and size over time, an outcome of such processes and algorithms executed at a given point in time may no longer be accurate by the time the outcome is ready for use.

Such considerations are particularly salient in machine learning and data mining applications, where input data sets are categorically large and often quite dynamic. For example, an outcome of a k-nearest neighbors algorithm may only be relevant or accurate for a short period of time, as the input vectors change at a rapid rate. Additionally, if such outcomes are used to improve the accuracy of other processes acting on the same or related data sets, if the outcome becomes too outdated, it may no longer be usable for those purposes.

While distributed (e.g., parallel) implementations of the aforementioned processes and algorithms may alleviate the latency of completing such tasks, they do not necessarily change the "lumpiness" of the output, nor do such implementations allow for adaptive responses to input data not yet processed by the distributed system. As computing resource service providers increasingly move toward decentralized, service-based models, the efficiency, predictability, and responsiveness of processes and algorithms for data processing becomes increasingly important.

BRIEF DESCRIPTION OF THE DRAWINGS

Various techniques will be described with reference to the drawings, in which.

DETAILED DESCRIPTION

Figure 1:
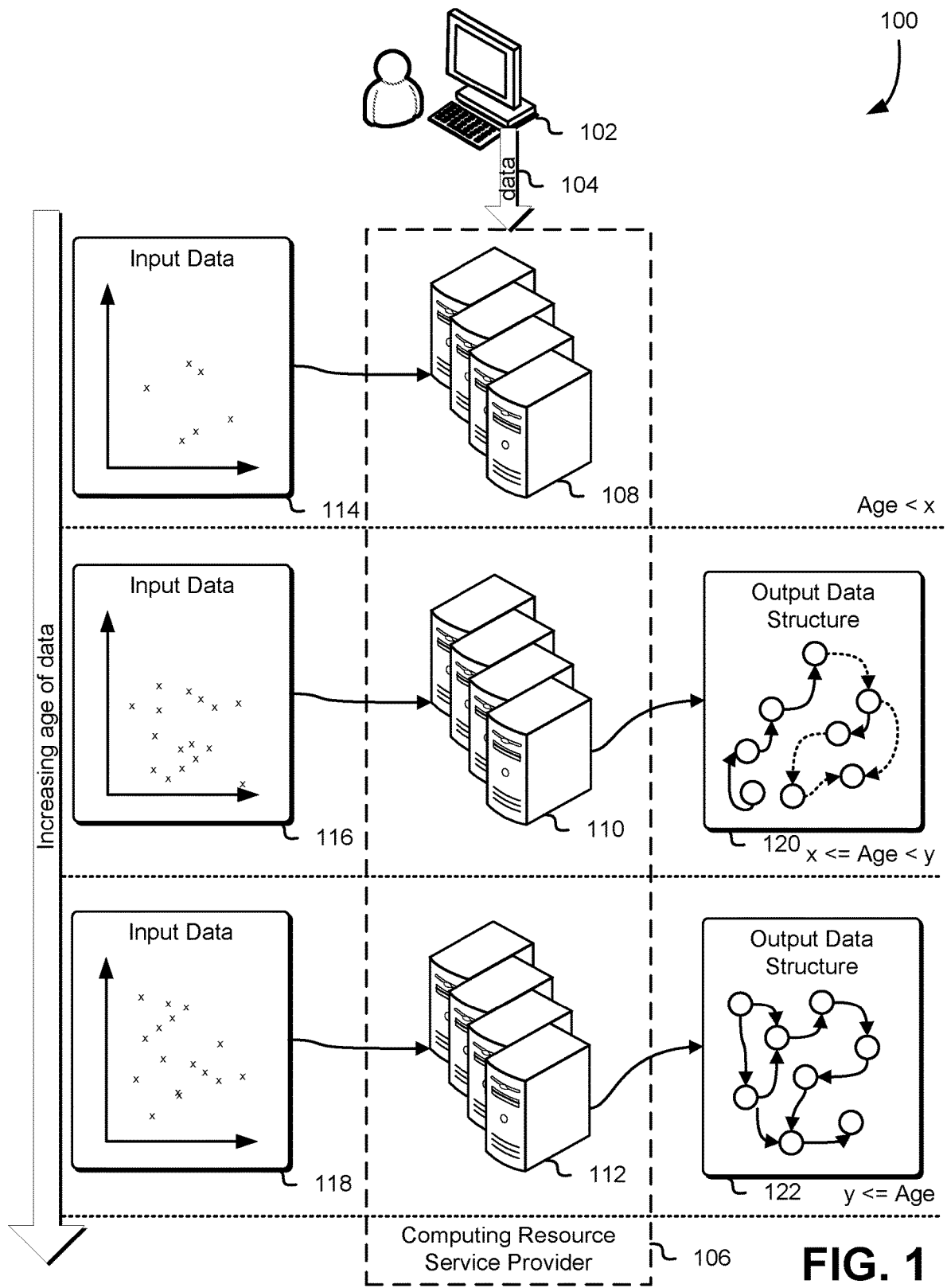
FIG. 1 illustrates a multitenant system that generates output data structures according to the age of the input data, in accordance with an embodiment.

In one embodiment, a computing resource service provider implements a service that enables connecting entities, such as customers and customer devices, to utilize resources of the computing resource service provider to process data using an algorithm appropriate for a query directed to the data. In one embodiment, the service provides access to computing resources to generate, in response to a query received by the service, data that represents a set of k-nearest neighbors to an input point (such as in an n-dimensional feature space of feature vectors representing objects within that space, where the feature vectors are the input data on which a given algorithm that generates the output k-nearest neighbors operates).

In one embodiment, the computing resource service provider provides a large quantity of distributed computing resources which may be arbitrarily agglomerated for a variety of purposes, and each agglomeration is parallelizable relative to other agglomerations as well as within a given agglomeration (e.g., a set of resources acting in concert, where some of the resources of the set operate in parallel with other resources in the set). A variety of different algorithms, such as those that calculate output data related to a k-nearest neighbors search, may be implemented to generate one or more intermediary output data structures that, in turn, are queryable so as to provide access to approximate and/or exact results in a faster and/or more efficient fashion than performing a direct brute force search against the input data (e.g., feature vectors within the feature space) itself.

In one embodiment, characteristics of some or all of the implemented algorithms differ, such as efficiency scaling relative to the input data set size, or, in the case of algorithms that generate approximate results, a target accuracy of the output data relative to the actual, exact result (referred to as "recall"). As requesting entities can define, indirectly or directly (e.g., as part of an initial query, and/or in connection with providing the data set to the computing resource service provider for processing), various parameters associated with the interaction between the entity and the computing resource service provider, the computing resource service provider selects, in one embodiment, one or more of the available algorithms based at least in part on the desired parameters and the characteristics of the various algorithms so as to fulfill the desired parameters.

In one embodiment, the connecting entity provides an ongoing stream of data to the computing resource service provider, and the computing resource service provider implements multiple sets of resources to process the data into queryable output data structures in a similarly ongoing basis. In one embodiment, a first set of resources processes, using an algorithm selected in a fashion mentioned previously, input data received over a first period of time to generate a first output data structure, which is then made available to requesting entities for queries regarding an approximate set of k-nearest neighbors to a given input point. The first period of time may be a defined in terms of thresholds, e.g., a finite period of time over which data is collected, a limit on the quantity or size (e.g., in bytes) of input vectors received, etc.

In one embodiment, once the threshold(s) are met, data received after the first period of time during a second period of time are collected (e.g., cached), but not processed, by a second set of resources using the selected algorithm until the second period of time (and/or thresholds associated therewith) are reached. Some or all of the threshold(s) associated with the second period of time may be different than or the same as the corresponding threshold(s) associated with the first period of time, and may, in one embodiment, correspond to similarities and/or differences between the first set of resources and the second set of resources.

In one embodiment, once the threshold(s) for the second set of resources are met (e.g., the new input data set reaches a certain size or quantity, and/or a period of time has elapsed since the previous "cutoff," the second set of resources processes the new input data to generate a second output data structure. The second output data structure thus corresponds to the latest state of the data available for normal queries, and provides a requestor with an output set of data having at least the desired characteristics (e.g., recall) for the input data received to that point.

In one embodiment, if an incoming processing query involves a data set not yet processed by a set of resources (or if the processing is not yet complete), the computing resource service provider processes the data received but not yet processed to that point on an ad hoc basis. In one embodiment, the algorithm used to provide an output data set may forgo an intermediary queryable data structure and instead provide a direct output data set. In one embodiment, the algorithm is an exact k-nearest neighbors algorithm. In one embodiment, the processing is brute force. In one embodiment, the algorithm used in such a "brute force" scenario is independent from that used during normal processing (e.g., the algorithm(s) selected according to previously mentioned techniques).

As may be contemplated, additional sets of resources may continue to be used to process data received over further periods of time subject to the aforementioned threshold(s). In one embodiment, a third, fourth, etc. set of resources is used to gather and subsequently process data received over a third, fourth, etc. period of time to generate respective data structures therefrom. In one embodiment, a set of resources previously used to process data, but no longer is associated with the latest version of an output data structure, may be reused for subsequent input data sets.

In one embodiment, an interface of the computing resource service provider, such as an interface that provides an application programming interface or web service to entities for transacting the aforementioned queries and associated results, implements or has access to a pointer that, from the perspective of the inquiring entity, is transparent (i.e., does not need to be specified for the query to be directed to a specific output data structure, data set, and/or set of resources). The pointer tracks a location (e.g., a URI or similar locator) for the set of resources that is associated with and/or stores the most recent version of the output data structure. As other resources generate subsequent output data structures, the pointer is updated, either by a listener process and/or by a notification of the generating resource set, to reflect the current version.

In one embodiment, the various output data structures generated by different sets of resources represent only the "delta"—that is to say, the changes to the broader input data set in the overall feature space over a period of time. As a result, the specific output data structures for input data over different period s of time are not necessarily cumulative with those that precede it. Accordingly, in one embodiment, the output data structures are combined, in connection with generation and/or in connection with a query directed to one or more of the output data structures, so as to provide indexing of all vectors in the feature space at the time represented by the most recent output data structure.

In one embodiment, as mentioned, some or all of the implemented sets of resources themselves comprise multiple resources that process, at least in part, portions of the input data in parallel. In one embodiment, each resource receives a portion, or "shard," of the overall set of input data and generates, as a subtask of the overall processing task, an output data structure from the assigned shard. The quantity and size of the shards may be determined in connection with various parameters associated with the operation of the set of resources, characteristics of the input data set, the selected algorithm(s), the desired characteristics of the output data structure(s) and/or expected query volume/size, and the like. The output data structures generated from the shards are, in one embodiment, combined, in connection with their generation and/or at runtime in connection with processing of a query.

In one embodiment, the performance of a selected algorithm is verified using a control set generated using an entity implemented by, or on behalf of, a computing resource service provider and/or a given set of resources. The input data used by a set of resources is subject to further processing, either by the set of resources or a different entity (e.g., a control set generator of the computing resources service provider), using a different algorithm known to provide verified results, such as exact results of an exact k-nearest neighbor algorithm, therefrom. The control set generated by the control set generator is then compared against the actual output data structure generated using the selected algorithm, and the results are then used to adjust parameters associated with the algorithm and/or the set of resources. In one embodiment, the recall performance of a given algorithm as verified against the control data structure is assigned a numerical score, which may be subject to a threshold, at and/or below which a mitigation workflow is initiated. In one embodiment, if the score is less than the threshold, the computing resource service provider replaces the selected algorithm with a different algorithm. In one embodiment, the aforementioned verification is repeated. The input data set(s), computing resource set(s), and/or algorithm(s) subject to the check, as well as the frequency with which the check is made, may be determined based at least in part on the query volume associated with the output data structure, historical performance of the algorithm, the size of the input data set(s), resources available to perform the check, and the like.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a multitenant system that generates output data structures according to the age of the input data, in accordance with an embodiment.

In one embodiment, a computing resource service provider 106 implements a service that enables connecting entities 102, such as customers and customer devices, to utilize resources 108, 110, 112 of the computing resource service provider 106 to process data 104 using an algorithm appropriate for a query directed to the data. In one embodiment, the service provides access to the computing resources 108, 110, 112 to generate, in response to a query received by the service, data that represents a set of k-nearest neighbors to an input point (such as in an n-dimensional feature space of feature vectors representing objects within that space, where the feature vectors are the input data on which a given algorithm that generates the output k-nearest neighbors operates). In one embodiment, the output data is represented in one or more output data structures 120, 122 which are queryable, and which are generated from the application of the aforementioned algorithm(s). Such output data structures provide faster and/or more efficient responses to queries, as they may be arranged in a searchable, hierarchical, and/or otherwise organized fashion, and allow for multiple queries against the same input data set without causing a rerun of the algorithm in response to each query.

In one embodiment, the computing resource service provider 106 provides a large quantity of distributed computing resources 108, 110, 112 which may be arbitrarily agglomerated for a variety of purposes, and each agglomeration is parallelizable relative to other agglomerations as well as within a given agglomeration (e.g., a set of resources acting in concert, where some of the resources of the set operate in parallel with other resources in the set). Within each set of resources, and/or as between different sets of resources, the resources may be homogenous, heterogeneous, or some combination thereof. In one embodiment, an agglomeration (e.g., 108, 110, 112) includes a "stack" of heterogeneous resources, which may include any number of physical computational resources such as general purpose computer processors, transitory memory (such as random-access memory), non-transitory memory such as storage media (e.g., hard disk drives, tape drives, solid state drives, optical disks, and the like), graphics processing units (GPUs), and so forth. In one embodiment, the resources are partially or entirely virtualized (e.g., virtual machine instances) forms of the physical resources of the computing resource service provider. In one embodiment, the sets of resources correspond to sets of physical computer systems (servers).

In one embodiment, the computing resource service provider 106 provides one or more services, via an interface (such as a graphical user interface and/or a programmatic interface, which can include web service calls, application programming interfaces, and the like), that allow requestors, such as the connecting entity 102, to transact data 104 with the computing resource service provider for various purposes. In one embodiment, the computing resource service provider, via the provided services and associated interface(s), processes requests/queries for higher level tasks, and the computing resource service provider implements and configures various resources to perform the requested task(s).

In one embodiment, the requestor 102 submits data 104, such as input data 114, 116, 118, to the computing resource service provider over a period of time, so as to cause the computing resource service provider to process the data 104 using one or more algorithm(s). The computing resource service provider 106 provides, via its interface(s), the output of the processing to, e.g., the requestor 102, or a different requestor, upon request.

In one embodiment, the sets of resources 108, 110, 112 are instantiated in connection with one or more attributes of the input data 114, 116, 118. Such attributes include one or more of input data size, actual or expected query volume, complexity of the algorithm(s) used to process the input data, availability of resources to allocate to each given set, attributes defined in connection with the processing request/query (e.g., defining a level of service and/or capability desired of the resources), load balancing by the computing resource service provider, and the like. The sets of resources 108, 110, 112 may be of the same, similar, or disparate capability (e.g., processing, storage, latency, reliability, availability, etc.) relative to one another, and may vary over time as the aforementioned attributes also may vary.

In one embodiment, a variety of different algorithms are implemented, one or more of which are selected by the computing resource service system to generate one or more intermediary output data structures 120, 122, that, as mentioned, are queryable so as to provide access to approximate and/or exact results in a faster and/or more efficient fashion than performing direct brute force processing against the respective input data 116, 118 itself. In one embodiment, the algorithms relate to a specific type of requested processing. In one embodiment, the requested processing generates a data set, or a data that represents a queryable form of the data set, that delineates the k-nearest neighbors to a queried input point within a feature space comprising the input data received to a given point in time, where the input data includes feature vectors that represent respective objects within the feature space.

As mentioned, the algorithms may, when implemented, generate either exact or approximate output (e.g., exact or approximate sets of nearest neighbors, in the case that the algorithms are k-nearest neighbor algorithms). In one embodiment, characteristics of some or all of the implemented algorithms differ, such as efficiency scaling relative to the input data set size, or, in the case of algorithms that generate approximate results, a target accuracy of the output data relative to the actual, exact result (referred to as "recall"). Algorithms for an exact k-nearest neighbor search include, without limitation, linear search, space partitioning / branch and bound methods (including generation of a k-d tree, an R- or R* tree, metric trees such as vp-trees and BK-trees, BSP trees), and the like. Algorithms for approximate k-nearest neighbor search include locality sensitive hashing, projected radial search, compression/clustering-based search, and greedy walk search. Implementations of such algorithms include, without limitation, FALCONN (Fast Lookups of Cosine and Other Nearest Neighbors), annoy, ball, BallTree, bruteforce-blas, bruteforce, flann, hnsw, kd, kgraph, lshf, nearpy, panns, rpforest, and SW-graph.

In one embodiment, as mentioned, the algorithms, when implemented and applied to the input data, generate queryable data structures as outputs. Such data structures include, without limitation, graphs, trees, hash tables, hash rings, bloom filters, and the like, and variations and subvariations thereof. In one embodiment, the output data structure is a hierarchical data structure, such as a hierarchical navigable small world (HNSW) graph.

As requesting entities can define, indirectly or directly (e.g., as part of an initial query, and/or in connection with providing the data set to the computing resource service provider for processing), various parameters associated with the interaction between the entity 102 and the computing resource service provider 106, the computing resource service provider selects, in one embodiment, one or more of the available algorithms based at least in part on the desired parameters and the characteristics of the various algorithms so as to fulfill the desired parameters. In one embodiment, the parameters include any of the requestor's desired level of recall, a size (in quantity and/or bytesize) of the input data 114, 116, 118 over a specified period of time (e.g., the rate at which the data flows inbound), expected and/or historical query volume against the input data 114, 116, 118 (e.g., for a given identity and/or requestor/set of requestors), capabilities of the implementing computing resource service provider 106 and/or some or all of the allocated sets of resources 108, 110, 112, and the like.

In one embodiment, as mentioned, the sets of resources 108, 110, 112 process the input data on an ongoing basis, as it arrives over a period of time as an ongoing stream of data to the computing resource service provider 106. The resources 108, 110, 112 process the data into queryable output data structures 120, 122 in a similarly ongoing basis. In one embodiment, a first set of resources 112 processes, using an algorithm selected in a fashion mentioned previously, input data 118 received over a first period of time to generate a first output data structure 122, which is then made available to requesting entities for queries regarding an approximate set of nearest neighbors to a given input point, which may also be defined in the queries. The first period of time may be a defined in terms of thresholds, e.g., a finite period of time over which data is collected, a limit on the quantity or size (e.g., in bytes) of input vectors received, etc. These thresholds may be fixed, variable based on the aforementioned parameters, predefined (such as by an administrator of the computing resource service provider 106 and/or by a customer associated with the input data 118, which is in one embodiment the requestor 102), and/or determined ex post (on a periodic and/or ad hoc basis) based on performance parameters resulting from the operation and/or management of the resources.

In one embodiment, once the threshold(s) are met, input data 116 received after the first period of time during a second period of time are collected (e.g., cached), but not processed, by a second set of resources 110 using the selected algorithm until the second period of time (and/or thresholds associated therewith) are reached. Some or all of the threshold(s) associated with the second period of time may be different than or the same as the corresponding threshold(s) associated with the first period of time, and may, in one embodiment, correspond to similarities and/or differences between the first set of resources 112 and the second set of resources 110.

In one embodiment, once the threshold(s) for the second set of resources 112 are met (e.g., the new input data set reaches a certain size or quantity, and/or a period of time has elapsed since the previous "cutoff," the second set of resources 110 processes the new input data to generate a second output data structure 120. The second output data structure 120 thus corresponds to the latest state of the data available for normal queries, and provides a requestor with an output set of data having at least the desired characteristics (e.g., recall) for the input data received to that point.

In one embodiment, the algorithm employed by the second set of resources 110 is different than that of the first 112. In one embodiment, the different algorithm employed by the second set of resources 110 is selected by either the requestor 102 or the computing resource service provider 106 based on performance parameters associated with the first resource 112, second resource 112, a change in the parameters defined for the processing and/or associated queries (e.g., a change in the recall), and/or if the determined recall associated with a previously generated output data structure 122 deviates sufficiently from a desired or required recall for the associated queries.

As may be contemplated, additional sets of resources, e.g., the third set of resources 108, and so forth, may continue to be used to process data received over further periods of time, e.g., input data 114, subject to the aforementioned threshold(s). In one embodiment, a set of resources previously used to process data, but no longer is associated with the latest version of an output data structure, e.g., the first set of resources 112 after second data structure 120 has been generated and/or verified by the second set of resources 110, may be reused to process subsequent input data sets. Until such time as the threshold(s) have been met, any queries directed to new input data that has not yet been indexed/processed are, in one embodiment, serviced using a different algorithm, such as an exact nearest neighbor search algorithm, according to techniques described elsewhere herein.

In one embodiment, the various output data structures 120, 122 generated by different sets of resources 112, 110 represent only changes to the broader input data set in the overall feature space over a period of time. In one embodiment, the input data 116 represents additional or otherwise changed input data relative to input data 118. As a result, the specific output data structures for input data over different period s of time are not necessarily cumulative with those that precede it. Accordingly, in one embodiment, the output data structures are combined, in connection with generation and/or in connection with a query directed to one or more of the output data structures, so as to provide indexing of all vectors in the feature space at the time represented by the most recent output data structure (output data structure 120, as illustrated, would be combined with output data structure 122). In one embodiment, the output data structures 120, 122 are not actually combined into a single data structure, but are addressed collectively in response to queries. In one embodiment, each input data set 118, 116, is cumulative relative to that which preceded it, and accordingly, the resultant output data structure 120, 122 is also cumulative (and thus independent of/replaces the one that precedes it).

Figure 2:
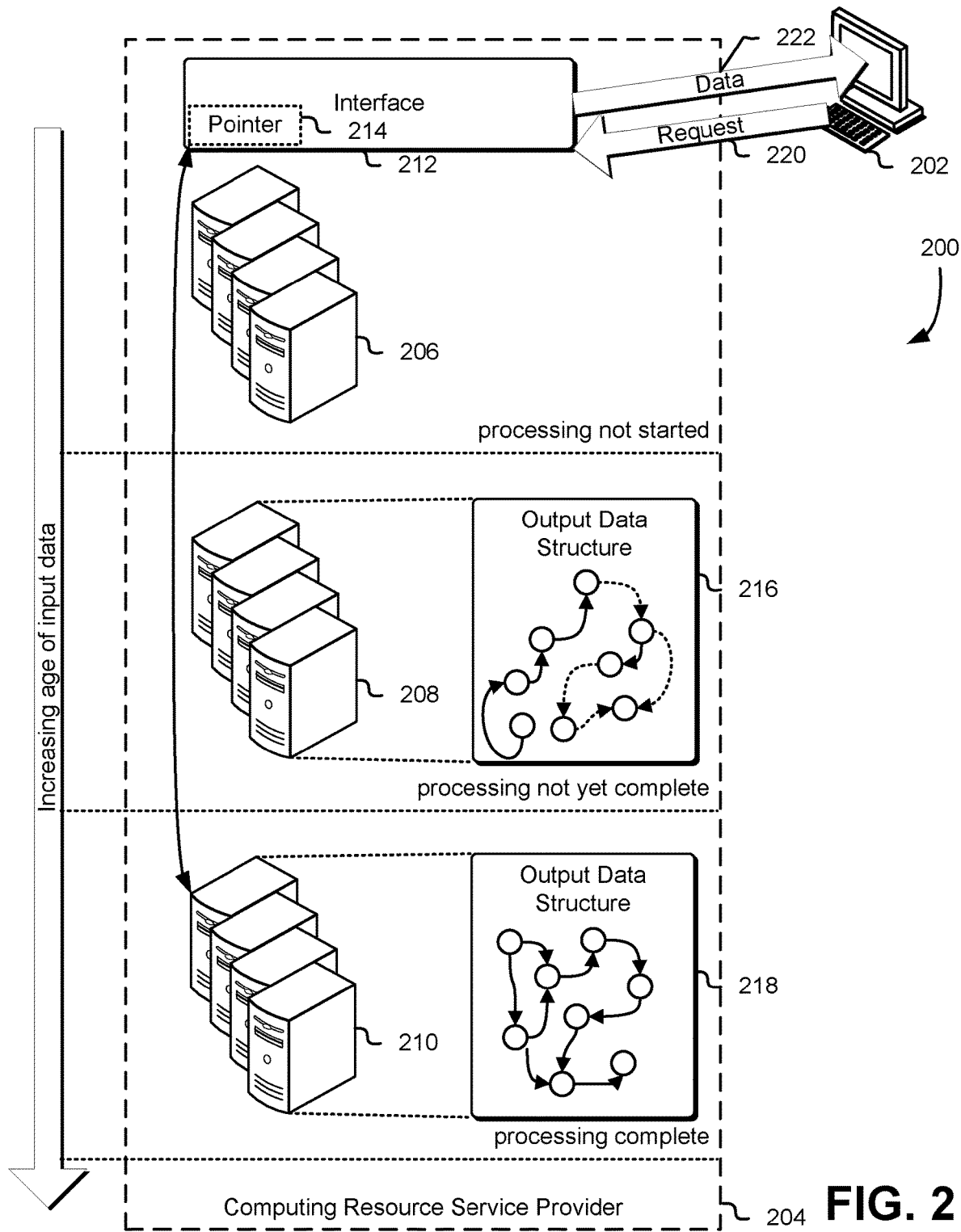
FIG. 2 illustrates a computing resource service provider that tracks the latest version of an output data structure to provide that data structure in response to queries, in accordance with an embodiment.

FIG. 2 illustrates a computing resource service provider that tracks the latest version of an output data structure to provide that data structure in response to queries, in accordance with an embodiment.

In one embodiment, an interface 214 of the computing resource service provider 204, such as an interface that provides an application programming interface or web service to entities 202 for transacting the aforementioned queries 220 and associated results 222 as previously mentioned, implements or has access to a pointer 214 that, from the perspective of the inquiring entity 202, is transparent (i.e., does not need to be specified for the query to be directed to a specific output data structure, data set, and/or set of resources). This, along with other techniques described herein, provides several technical advantages and improvements to the functionality of the resources of the computing resource service provider, as well as from the perspective of the requestor 202. The computing resource service provider may more granularly deploy resources over a period of time to account for various attributes of the processing task(s), resulting in improved efficiency and utilization for any given deployed computing resource 206, 208, 210, as well as providing the requestor with lower latency access to processed results relative to the input data set (i.e., the resultant output data structures 216, 218 enable efficient querying and retrieval of processing output that is less "stale" relative to the time the input data was received by a respective resource 208, 210).

As mentioned, the interface 212 is, in one embodiment, provided and implemented by the computing resource service provider, using one or more computing resources of the computing resource service provider. The interface 212 implements or has access to a pointer 214 that tracks a location (e.g., a universal resource identifier (URI) or similar locator) for the set of resources that is associated with and/or stores the most recent version of the output data structure. In one embodiment, the pointer 214 is a symbolic link in one or more data structures, such as those implemented by a database, a file system, or other higher level abstraction, that provides a static reference usable by the interface 212 that maps to a dynamically changing location (e.g., a requestor 202 providing a request 220 to the interface 212 to locate nearest neighbors to a given input point against the most recently processed data set would be provided, via the pointer 214, a result associated with the output data structure 218, as illustrated, as the output data structure 216 has not yet been completed).

The pointer 214 is updated as newer output data structures (e.g., 216) are subsequently generated over time. In one embodiment, the pointer 214 is updated by a listener process or entity operating and/or implemented and/or by the computing resource service provider 204, and external to that of the respective sets of processing resources 206, 208, 210. In one embodiment, each respective set of resources 206, 208, 210 sends a notification to the interface 212, in connection with completion and availability of the output data structure 216, which includes at least the location of the completed and available output data structure 216, 218. In one embodiment, the output data structure 216, 218 remains hosted by one of the respective resource(s) 208, 210 that generated it. In one embodiment, upon completion, the output data structure 216, 218 is stored elsewhere, such as using a data storage service provided by the computing resource service provider 204.

Figure 3:
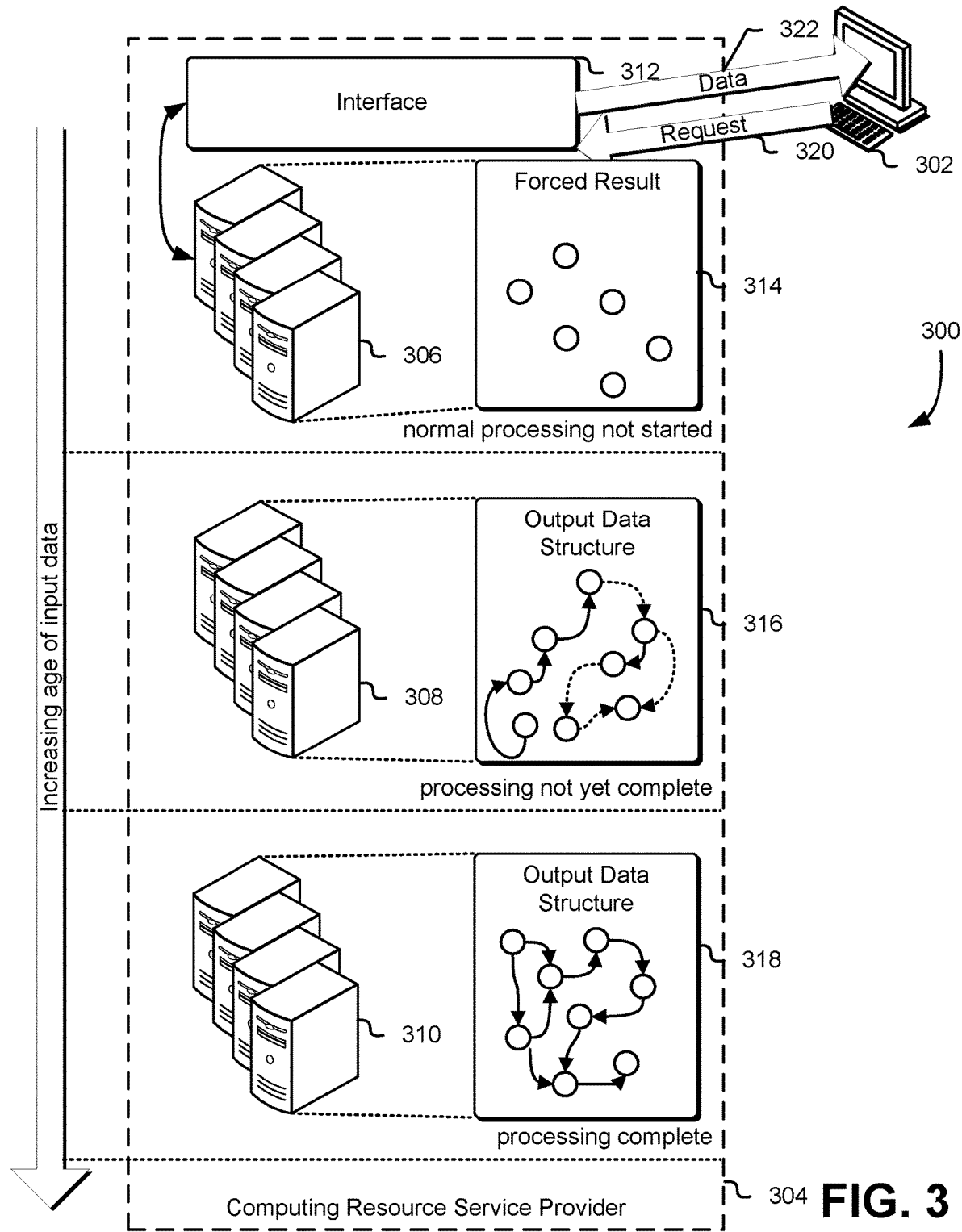
FIG. 3 illustrates a system that uses a second algorithm, such as a brute force and/or exact outcome algorithm, to process data not yet processed by a first algorithm in connection with a query for an outcome related to the associated data, in accordance with an embodiment.

FIG. 3 illustrates a system that uses a second algorithm, such as a brute force and/or exact outcome algorithm, to process data not yet processed by a first algorithm in connection with a query for an outcome related to the associated data, in accordance with an embodiment.

In one embodiment, a computing resource service provider 304 interacts, via an interface 312, with connecting entity/ies 302 so as to receive, process, and respond to request 320, such as with data 322 (e.g., results 314, 316, 318, as described in further detail herein), in a fashion similar to that described elsewhere in this disclosure. As mentioned, such as in connection with FIGS. 1 and 2, in one embodiment, sets of resources 308, 310 generate respective output data structures 316, 318 once incoming data, such as input vectors, received over a period of time reach one or more threshold(s). In one embodiment, also as mentioned, the set of resources 308 processes data received after the output data structure 318 generated by the set of resources 310 has been generated. While the output data structure 316 is being generated by the set of resources 308, data received after the threshold(s) for the set of resources 308 have been met is directed to the set of resources 306.

If an incoming processing query (e.g., request 320) involves a data set presently being collected by the set of resources 306 (i.e., not yet meeting the threshold(s) for commencing processing of the input data set using the selected algorithm), the computing resource service provider processes the data associated with that input data set on an ad hoc basis. In one embodiment, the algorithm used to provide an output data set may forgo an intermediary queryable data structure and instead provide a direct output data set. In one embodiment, the algorithm is an exact nearest neighbors search algorithm. In one embodiment, the processing is brute force (that is to say, the algorithm is processed on an ad hoc basis so as to generate exact results, without the aforementioned indexing optimizations). In one embodiment, the algorithm used in such a "brute force" scenario is independent from that used during normal processing (e.g., the algorithm(s) selected according to previously mentioned techniques). In one embodiment, the selected algorithm(s) provide approximate nearest neighbors results represented by queryable output data structures, while the "brute force" scenario causes exact nearest neighbors results without an intermediary output data structure.

If an incoming processing query (e.g., request 320) involves a data set presently being processed by the set of resources 308, but the output data structure 316 generated therefrom is not yet available, in one embodiment, the computing resource service provider 304 determines whether to service the query by using the aforementioned brute force method, or instead wait until the pending processing has been completed. This determination may be made based on any number of appropriate parameters, including but not limited to the expected time to completion of the generation of the output data structure 316, the expected time to completion of the brute force mechanism, a level or capability of resources of the sets of resources to perform either or both the pending generation of the output data structure 316 and/or the brute force mechanism, instructions provided by a requestor, and the like. As may be contemplated, the same determination may also be made for input data sets for which output data structure generation has not yet commenced.

In one embodiment, to the extent that the results of an ad hoc processing methodology initiated as a result of an incoming query have characteristics, such as recall, that meet or exceed that which are required of ordinarily processed results (e.g., using the selected algorithm and generating a queryable data structure) from the same input data set, the results of the brute force methodology are integrated into the ordinary processing workflow and/or the output data structure generated therefrom. This allows an implementing system to recoup some of the resources expended as a result of the ad hoc methodology by reducing the amount of processing necessary to meet the desired characteristics (e.g., recall).

Figure 4:
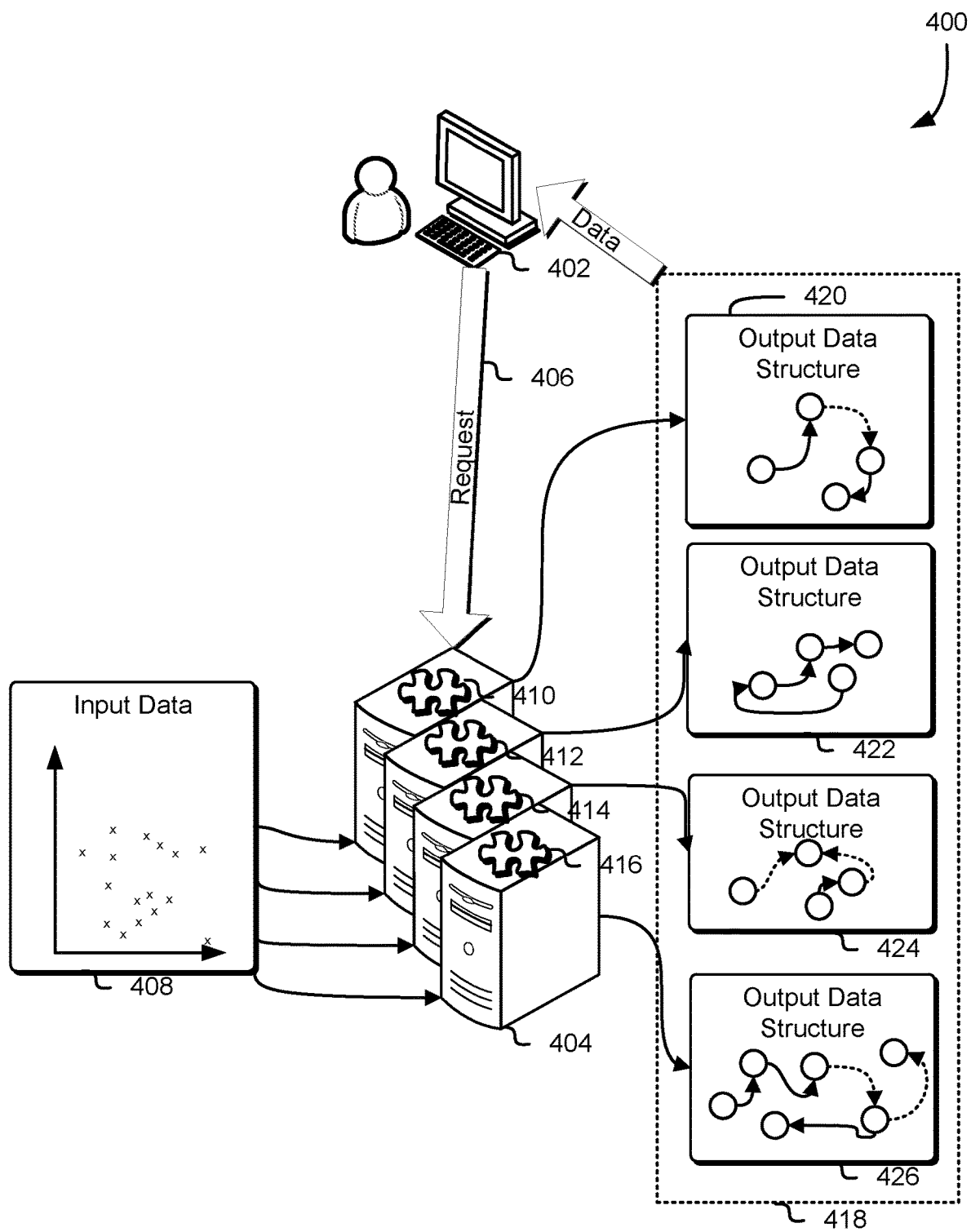
FIG. 4 illustrates segmentation ("sharding") of input data to enable parallel computation of subtasks associated with a broader data processing task, in accordance with an embodiment.

FIG. 4 illustrates segmentation ("sharding") of input data to enable parallel computation of subtasks associated with a broader data processing task, in accordance with an embodiment.

In one embodiment, as mentioned, some or all of the implemented sets of resources themselves comprise multiple resources that process, at least in part, portions of the input data 408 in parallel. In one embodiment, a connecting entity 402 submits input data 408 and/or a request 406 to process such data, to a computing resource service provider, which in turn forwards the request or initiates an associated set of tasks to the appropriate set of resources 404. The set of resources 404, an entity thereof, or a different entity of the computing resource service provider process the received input data 408 into a series of portions, or "shards," such that each resource receives one or more of the shard(s) 410, 412, 414, 416.

The shards 410, 412, 414, 416 are, in one embodiment, processed from the input data such that they are redundant in the sense that, if one or more of the shards 410, 412, 414, 416 (or resource to which it is assigned) becomes unavailable, it still may be regenerated and/or processed. In one embodiment, the shards 410, 412, 414, 416 do not overlap with regard to the portions of the input data assigned thereto. In one embodiment, the shards 410, 412, 414, 416 overlap up to a predetermined degree. The shards 410, 412, 414, 416 may be replicated such that if one of the resources processing the shards 410, 412, 414, 416 becomes unavailable, the replica of the missing shard may be processed by a different resource.

The quantity and size of the shards 410, 412, 414, 416 may be determined in connection with various parameters associated with the operation of the set of resources 404, characteristics of the input data set 408, the selected algorithm(s), the desired characteristics of the output data structure(s) 420, 422, 424, 426, an expected volume and/or complexity of requests 406, and the like. In one embodiment, the computing resource service provider and/or the set of resources 404 weighs the benefits of increased parallelism (e.g., increased processing efficiency) against the additional resource overhead generated by more granular sharding (e.g., increase in amount of storage and/or memory space for the replicated and/or overlapped shards, increase in the probability that one or more shards becomes unavailable), using one or more of the aforementioned parameters, in order to determine the size and/or quantity of the resultant shards (and, in one embodiment, whether to shard the input data 408 at all).

In one embodiment, each resource processing a shard 410, 412, 414, 416 produces a respective output data structure 420, 422, 424, 426 from that shard. The output data structures 420, 422, 424, 426 are in one embodiment, collectively addressable as if it was a larger output data structure 418 that represents the overall input data set 408. In one embodiment, the output data structures 420, 422, 424, 426 are combined in connection with generation thereof to generate the full output data structure. In one embodiment, a query 406 against the input data set 408 initiates, in connection with processing of the query 406, one or operations to combine at least some of the component output data structures 420, 422, 424, 426 to generate the response data.

Figure 5:
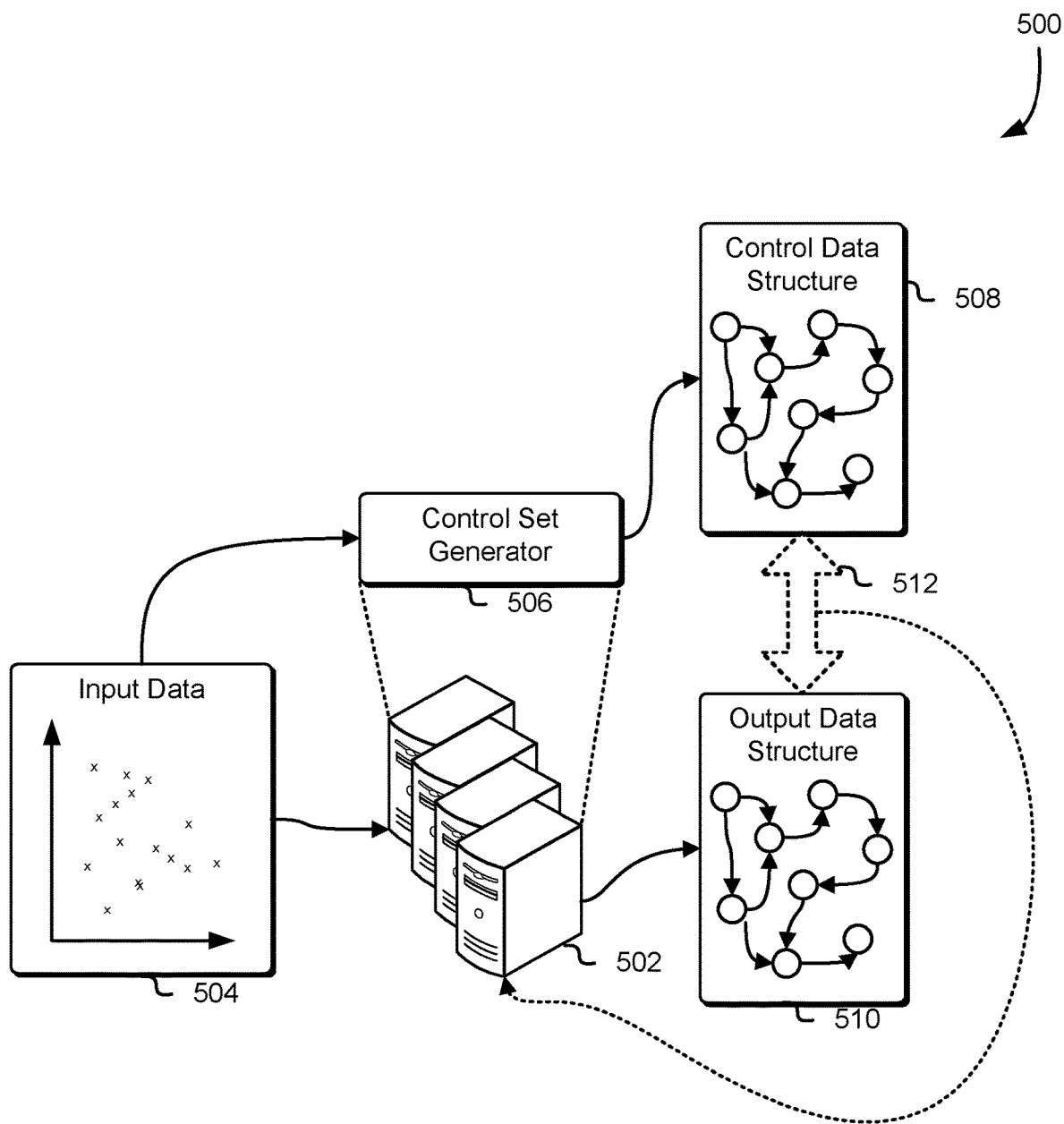
FIG. 5 illustrates generation and use of a control data structure to verify one or more characteristics of an output data structure associated with a given set of input data, in accordance with an embodiment.

FIG. 5 illustrates generation and use of a control data structure 508 to verify one or more characteristics of an output data structure 510 associated with a given set of input data 502, in accordance with an embodiment.

In one embodiment, the performance of a selected algorithm is verified using a control set generated using an entity implemented by, or on behalf of, a computing resource service provider and/or a given set of resources. The input data 504 used by a set of resources 502 is subject to further processing, either by the set of resources or a different entity (e.g., a control set generator 506 of the computing resources service provider), using a different algorithm known to provide verified results, such as exact results of an exact nearest neighbor search algorithm, therefrom.

In one embodiment, the control set generator 506 is an entity instantiated from or by the set of resources 502, such as an executable process implementing the verification algorithm. In one embodiment, the control set generator 506 is implemented separately from the set of resources 502, such as a monitoring or other executable process running on administrative resources of the implementing computing resource service provider. The control set generator 506 generates a control data structure 508, which is then compared 512 against the actual output data structure 510 generated using the selected algorithm in nominal operation, and the results are then used to adjust parameters associated with the algorithm and/or the set of resources 502.

In one embodiment, the recall performance of a given algorithm as represented by the output data structure 510 is verified against the control data structure 508, and is assigned a numerical score that indicates the accuracy of the estimated result relative to the known, exact and correct result represented by the control data structure 508. The numerical score is then compared against a threshold, at and/or below which a mitigation workflow is initiated by the implementing computing resource service provider and/or the set of resources 502 to which the algorithm applies. In one embodiment, if the score is less than the threshold, the computing resource service provider replaces the selected algorithm with a different algorithm. In one embodiment, the aforementioned verification is repeated to determine whether the new algorithm has better recall performance relative to the algorithm it replaced. The specific input data set(s) 504 computing resource set(s) 502, and/or algorithm(s) subject to the check, as well as the frequency with which the check is made, may be determined by the computing resource service provider based at least in part on one or more of several factors, including the query volume associated with the output data structure and/or a given requestor associated with the output data structure, historical performance of the algorithm, the size, complexity, and/or contents of the input data set(s), resources available to perform the check, and the like.

Figure 6:
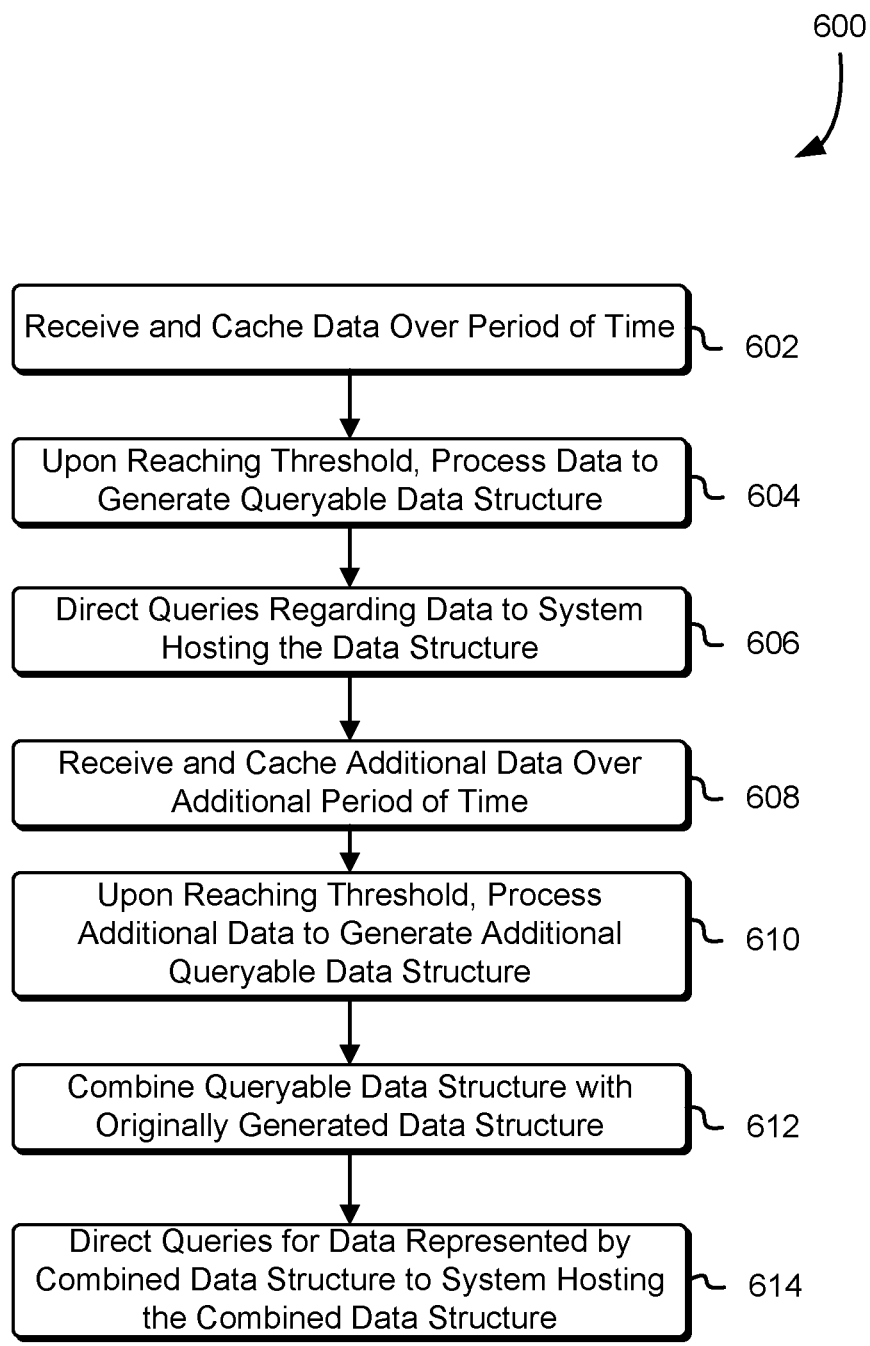
FIG. 6 illustrates a process for generating multiple versions of a queryable data structure over time in a multitenant system, in accordance with an embodiment.

FIG. 6 illustrates a process for generating multiple versions of a queryable data structure over time in a multitenant system, in accordance with an embodiment.

At step 602, data, such as input vector data, is received and cached by an entity of a computing resource service provider, over a period of time. The data may be received via an interface of the computing resource service provider, which in turn provides the received data to a set of resources of the computing resource service provider to cache or otherwise store until a characteristic threshold (e.g., time, data payload size, cache size, vector quantity) is reached.

At step 604, upon reaching the threshold, the assigned set of resources processes the data using an algorithm, such as a k-nearest neighbors-related algorithm, to generate a queryable data structure representing the desired output results. As mentioned, the queryable data structure may be a graph, such as a hierarchical navigable small world graph.

At step 606, queries regarding the generated output data structure (e.g., queries to determine vectors nearest a given input point for a given input data set having been processed in step 604) are directed to the set of resources, such by an interface of the computing resource service provider implementing a pointer. At step 608, additional input data received by the computing resource service provider over an additional period of time subsequent to the period of time mentioned in step 602, is distributed to and cached by a different set of resources until, at step 610, one or more threshold(s) is/are reached and an additional queryable data structure is generated therefrom.

At step 612, the first data structure generated in step 604 and the additional data structure generated in step 610 are combined, such as by the additional set of resources (or other recipient of a query, such as an interface of the computing resource service provider), in connection with the completion of the generation of the additional data structure and/or at runtime in connection with a query against the additional data structure. At step 614, the combined data structure, whether actually combined or individual data structures addressed as a combined data structure, are made available for queries against the processed data set(s), such as nearest neighbor searches.

Figure 7:
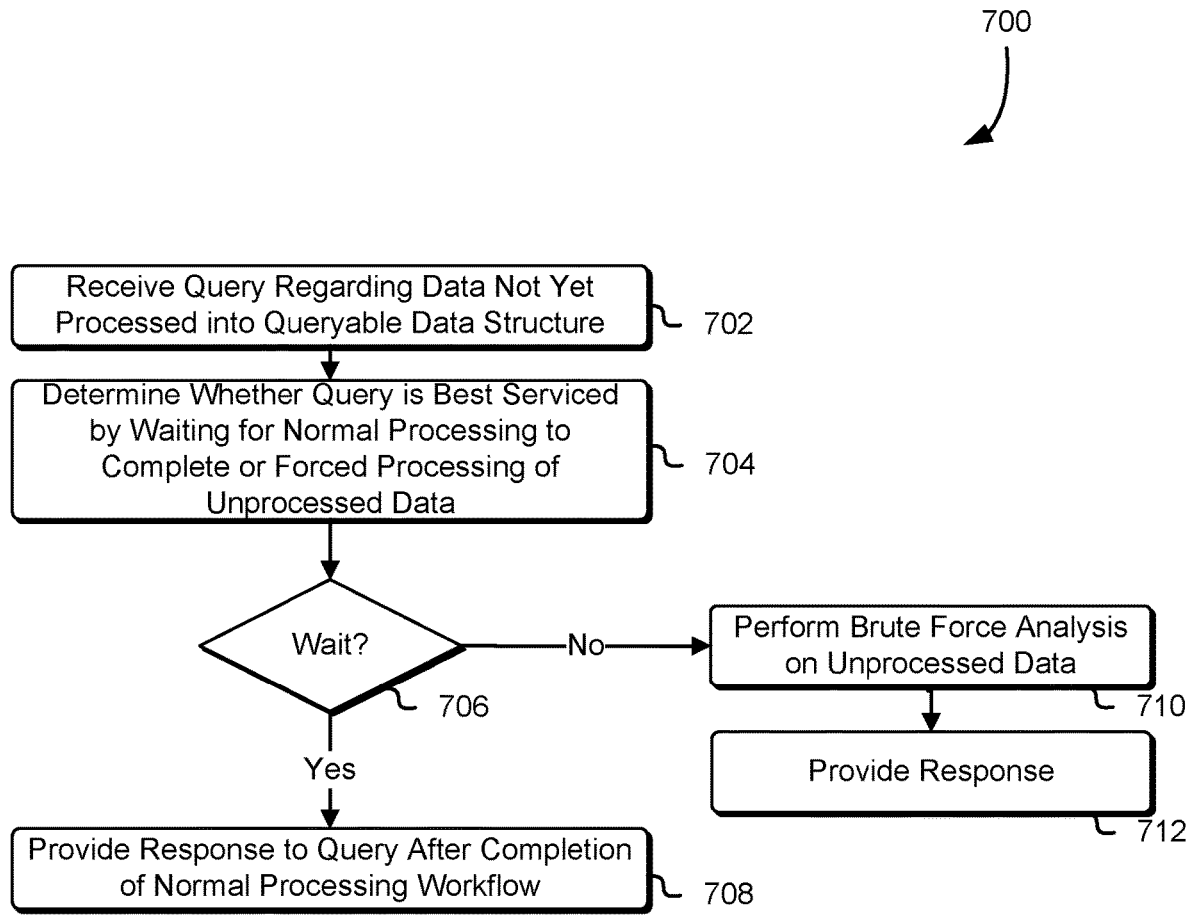
FIG. 7 illustrates a process for responding to requests related to input data not yet processed by an indexing algorithm, in accordance with an embodiment.

FIG. 7 illustrates a process for responding to requests related to input data not yet processed by an indexing algorithm, in accordance with an embodiment.

At step 702, a query is received by an interface of an implementing computing resource provider, where the query is directed to input data newer than that which has already been completely processed. At step 704, a set of resources that is associated with the input data involved with the received query determines whether the query is best serviced by either waiting for pending processing for that data set is complete, or to force an ad hoc processing workflow. As previously mentioned, the determination may be made based on one or more parameters, such as the relative time to completion of either or both the pending processing task and/or the expected time to completion of the potential ad hoc processing work flow.

At decision point 706, if the set of resources determines that the query should be serviced upon completion of the normal processing workflow, at step 708, the set of resources returns the query results after the output data structure has been generated and/or if the output data structure includes enough information in a partially complete state to provide a set of output results that meet one or more criteria associated with the query and/or the input data set (e.g., recall of the resultant output).

However, if at decision point 706 the set of resources determines that the ad hoc processing workflow should be initiated, at step 710, the set of resources performs a brute force analysis of the input data set using the same or different algorithm. In one embodiment, the brute force analysis utilizes an exact nearest neighbor search algorithm to generate an output result from the data set, forgoing the intermediary output data structure. At step 712, the set of resources returns the query results generated in step 710.

Figure 8:
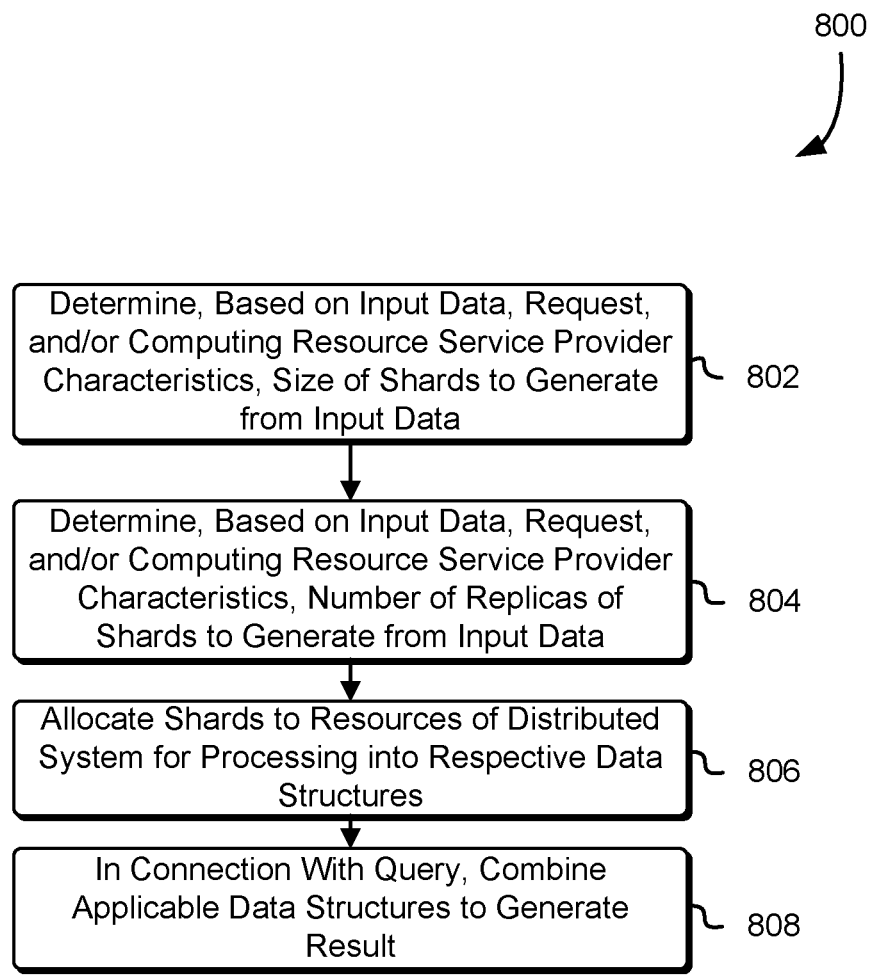
FIG. 8 illustrates a process for sharding input data for parallel processing by multiple workers implemented by a data processing system, in accordance with an embodiment.

FIG. 8 illustrates a process for sharding input data for parallel processing by multiple workers implemented by a data processing system, in accordance with an embodiment.

At step 802, an entity of an implementing computing resource service provider, such as a set of resources designated for processing input data received by an interface of the computing resource service provider, determines whether to process input data into shards and, if so, the quantity and/or size of such shards, for further processing by resources of the set of resources. The aforementioned determination is made, in one embodiment, based on one or more of the characteristics of the input data, the characteristics of the expected queries against that data, parameters defined in a request associated with receiving the data for processing, and/or other characteristics attributable to entities of the computing resource service provider.

At step 804, some or all of the characteristics used to determine the size and quantity of the shards in step 802, as well as the number and/or size of the shards generated in step 802, are used by the set of resources to determine how many replicas of each shard to generate so as to balance availability, redundancy, and/or resource usage.

At step 806, the set of resources generates the shards according to the parameters determined in steps 802 and 804, and distributes the shards to a plurality of resources of the set of resources, which in turn process each shard into a respective output data structure using the selected algorithm (such as a nearest neighbor search-related algorithm). At step 808, in connection with receiving a query associated with the output data structures, some or all of the individual output data structures are combined or otherwise addressed as a larger, combined output data structure to return the result desired by the query.

Figure 9:
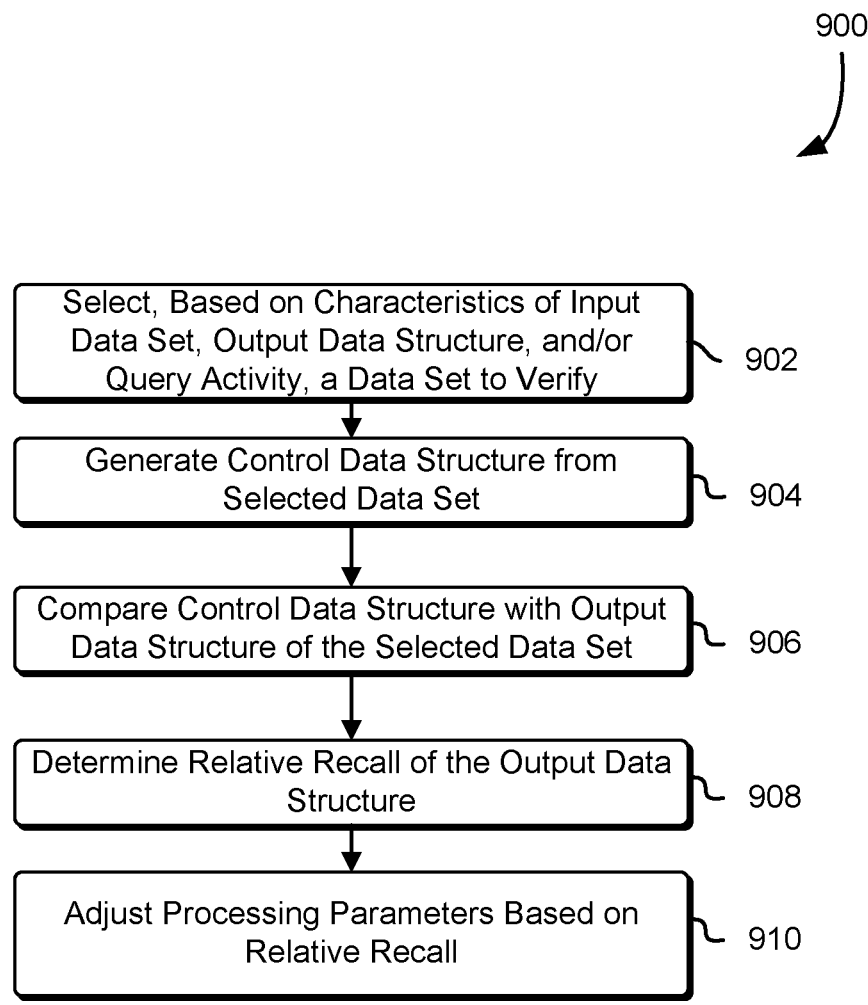
FIG. 9 illustrates a process for verifying and adjusting the characteristics of a data processing algorithm implemented by a multitenant system, in accordance with an embodiment.

FIG. 9 illustrates a process for verifying and adjusting the characteristics of a data processing algorithm implemented by a multitenant system, in accordance with an embodiment.

At step 902, an entity of a computing resource service provider, such as a control set generator implemented by or for a given set of resources processing input data, selects one or more input data sets for which to verify the performance of an algorithm used to generate output data structures from those input data sets. The selection is made, in one embodiment, based on one or more characteristics associated with the input data set, the output data structure, a history of query activity associated with the selected input data set, and the like.

At step 904, the control set generator generates, using an algorithm that generates exact results or otherwise has a verified or verifiable level of performance (e.g., recall, in the case of approximate nearest neighbor searches) for the selected input set, a control data set, such as a control data structure, from the input set for which to verify the output generated by the nominal algorithm used to generate it. At step 906, the control data set and the output data structure to be verified is compared so as to generate, at step 908, a recall metric for the output data structure relative to that of the control data set. At step 910, the recall metric is assessed against one or more criteria, such as threshold(s) for initiating mitigation workflows, and, if necessary, the set of resources or other entity of the computing resource service provider initiates a mitigation workflow to adjust one or more processing parameters. Such processing parameters include, as previously mentioned, the algorithm used for future processing/reprocessing of the input data set, parameters associated with the functionality of the existing algorithm, and the like.

Figure 10:
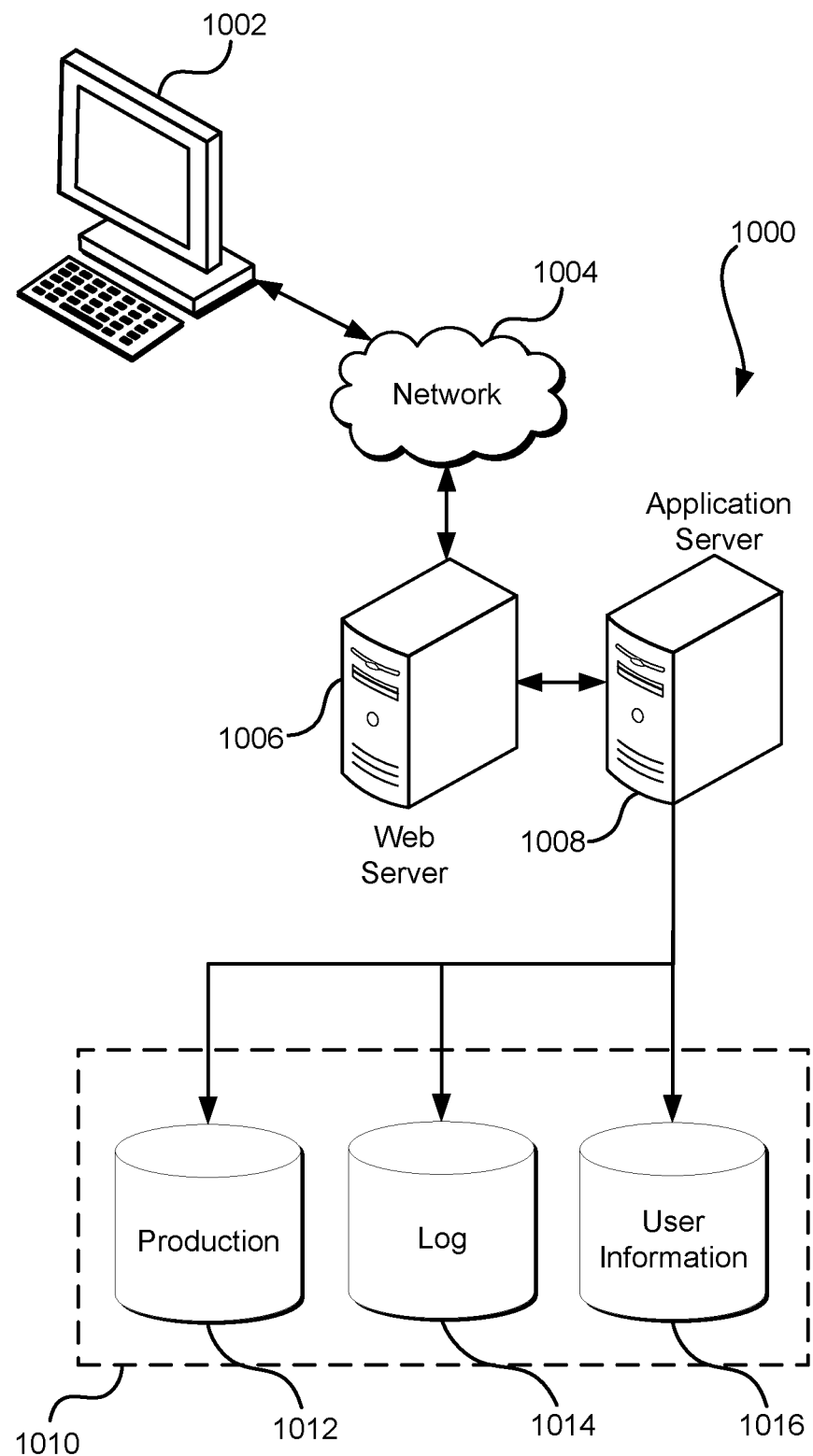
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a first set of vector data;
   processing, using a first algorithm, the first set of vector data to generate a first data structure that includes data representative of a set of neighbors to elements of the first set of vector data;
   providing the first data structure, via an interface, for queries associated with the set of neighbors to the elements of the first set of vector data;
   receiving a second set of vector data;
   processing, using the first algorithm, the second set of vector data to generate a second data structure that includes data representative of a set of neighbors to elements of the second set of vector data;
   merging the first data structure and the second data structure to generate a third data structure that includes elements accumulated, over a length of time, from the first data structure and second data structure; and
   providing the third data structure via the interface for queries associated with the set of neighbors to the elements of either the first set of vector data or the second set of vector, wherein in connection with successfully merging the first data structure and the second data structure, the interface is updated to indicate a location of the third data structure.

2. The computer-implemented method of claim 1, wherein the first set of vector data includes data received over a first period of time, and the second set of vector data includes data received during a second period of time after the first period of time.

3. The computer-implemented method of claim 2, further comprising:
   receiving a third set of vector data that includes data received during a third period of time after the second period of time; and
   processing, in response to a query associated with relative proximity of elements of the third set of vector data, the third set of vector data using a different second algorithm that generates a type of result different than that of the first algorithm.

4. The computer-implemented method of claim 1, wherein:
the interface tracks a pointer to a location of the first data structure
and updates the pointer to indicate the location of the third data structure in connection with successfully merging the first data structure and the second data structure.

5. The computer-implemented method of claim 1, wherein the third data structure comprises elements of the first data structure and the second data structure.

6. A system, comprising:
one or more processors; and
memory that stores computer-executable instructions that, as a result of being executed, cause the one or more processors to:
operate a first host of the system to generate a first data structure from a first set of vector data, the first data structure including data indicative of relative proximity of elements in the first set;
operate a second host of the system to:
generate a second data structure from a second set of vector data received after the first set, the second data structure including data indicative of relative proximity of elements in the second set; and
merge the first data structure and the second data structure into a third data structure, wherein an interface of the system is updated to indicate a location of the first data structure and a location of the third data structure in connection with successfully merging the first data structure and the second data structure; and
operate a third host of the system to receive a third set of vector data during a length of time that at least partially overlaps with the operation of the second host to generate the second data structure or merge the first and second data structure.

7. The system of claim 6, wherein the instructions further cause the one or more processors to process, at a time prior to or during the merging of the first data structure and the second data structure, a query related to the first set of vector data using the relative proximity of the elements indicated by the first data structure.

8. The system of claim 6, wherein the instructions further cause the one or more processors to process, at a time after the merging of the first data structure and the second data structure, a query related to the first set of vector data using the relative proximity of the elements indicated by the third data structure.

9. The system of claim 6, wherein the instructions further cause the one or more processors to process, at a time prior to or during the merging the first data structure and the second data structure, a query related to the second set of vector data using a brute force algorithm against the second set of vector data.

10. The system of claim 6, wherein the instructions further cause the one or more processors to process a query related to the third set of vector data using a brute force algorithm against the third set of vector data.

11. The system of claim 6, wherein the first set of vector data is split into a plurality of shards, a subset of which is processed by a first resource of the second host, and a different subset of which is processed by a different second resource of the second host.

12. The system of claim 6, wherein the first data structure and the second data structure are graphs generated using an approximate k-nearest neighbors algorithm.

13. A non-transitory computer-readable storage medium having stored thereon executable instructions that, as a result of being executed by one or more processors of a computer system, cause the computer system to at least:
receive a query to determine a data set with members having a likelihood of being most proximate to a vector, the query including the likelihood and the vector;
determine, based at least in part on the query, a data set version associated with the query;
select a set of vector data corresponding to the data set version;
determine, based at least in part on the data set version and the set of vector data, an algorithm with which to generate the data set from a set of vector data;
process the set of vector data using the algorithm to generate the data set to include data representing relative proximity of elements of the set of vector data; and
provide the data set.

14. The non-transitory computer-readable storage medium of claim 13, wherein the instructions that determine the algorithm further comprise instructions that, as a result of being executed by the one or more processors, cause the computer system to merge the data set with a different data set generated for a prior data set version.

15. The non-transitory computer-readable storage medium of claim 13, wherein the algorithm is an exact k-nearest neighbors algorithm.

16. The non-transitory computer-readable storage medium of claim 13, wherein the instructions further cause the computer system to generate, prior to receiving the query and using a different algorithm, a data structure from a different set of vector data corresponding to a prior data set version.

17. The non-transitory computer-readable storage medium of claim 16, wherein the instructions further cause the computer system to merge the data set into the data structure.

18. The non-transitory computer-readable storage medium of claim 17, wherein the instructions further cause the computer system to respond to a second query associated with the data set version and received after the merging using at least the merged data structure.

19. The non-transitory computer-readable storage medium of claim 16, wherein the data structure is a graph.

20. The non-transitory computer-readable storage medium of claim 19, wherein the graph is a hierarchical navigable small world graph.

* * * * *